United States Patent [19]

Neeley

[11] Patent Number: 5,423,188

[45] Date of Patent: Jun. 13, 1995

[54] PROCESS FOR DETECTING OUT-OF-RANGE THERMISTOR

[75] Inventor: Timothy A. Neeley, Indianapolis, Ind.

[73] Assignee: Carrier Corporation, Syracuse, N.Y.

[21] Appl. No.: 210,542

[22] Filed: Mar. 17, 1994

[51] Int. Cl.⁶ .......................................... F25B 49/02
[52] U.S. Cl. ........................................ 62/126; 62/129
[58] Field of Search ................ 62/126, 129, 130, 125, 62/127; 165/11 R; 236/94

[56] References Cited

U.S. PATENT DOCUMENTS

| | | | |
|---|---|---|---|
| 4,211,089 | 7/1980 | Mueller et al. | 62/126 X |
| 4,381,549 | 4/1983 | Stamp, Jr. et al. | 165/11 R X |
| 4,535,598 | 8/1985 | Mount | 62/126 |
| 4,555,057 | 11/1985 | Foster . | |
| 4,660,386 | 4/1987 | Hansen et al. | 62/126 |
| 4,848,096 | 7/1989 | Funahashi et al. | 62/129 X |
| 4,995,240 | 2/1991 | Barthel et al. . | |
| 5,097,288 | 3/1992 | Akao et al. . | |

FOREIGN PATENT DOCUMENTS 2238275 9/1990 Japan .

Primary Examiner—Harry B. Tanner

[57] ABSTRACT

A process for detecting and reporting an out-of-range condition in at least one of a plurality of thermistors operatively associated with a heat pump used as a climate control apparatus, the heat pump having an ambient thermistor and a coil thermistor, comprising the steps of: determining a coil thermistor value, determining an ambient thermistor value, comparing the coil thermistor value with the ambient thermistor value, and reporting to a heat pump control system if the ambient thermistor value is out of range with respect to the coil thermistor value.

8 Claims, 5 Drawing Sheets

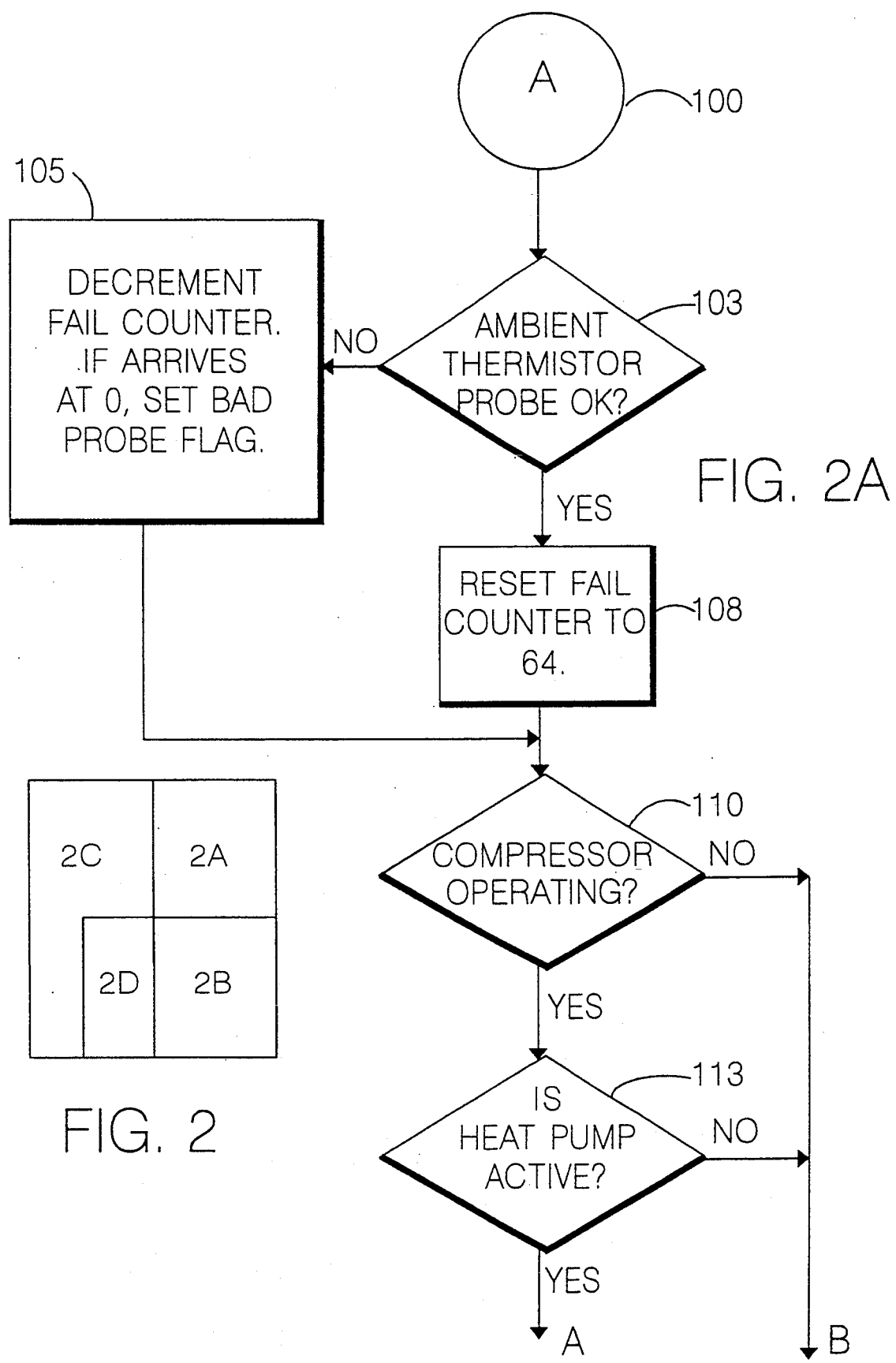

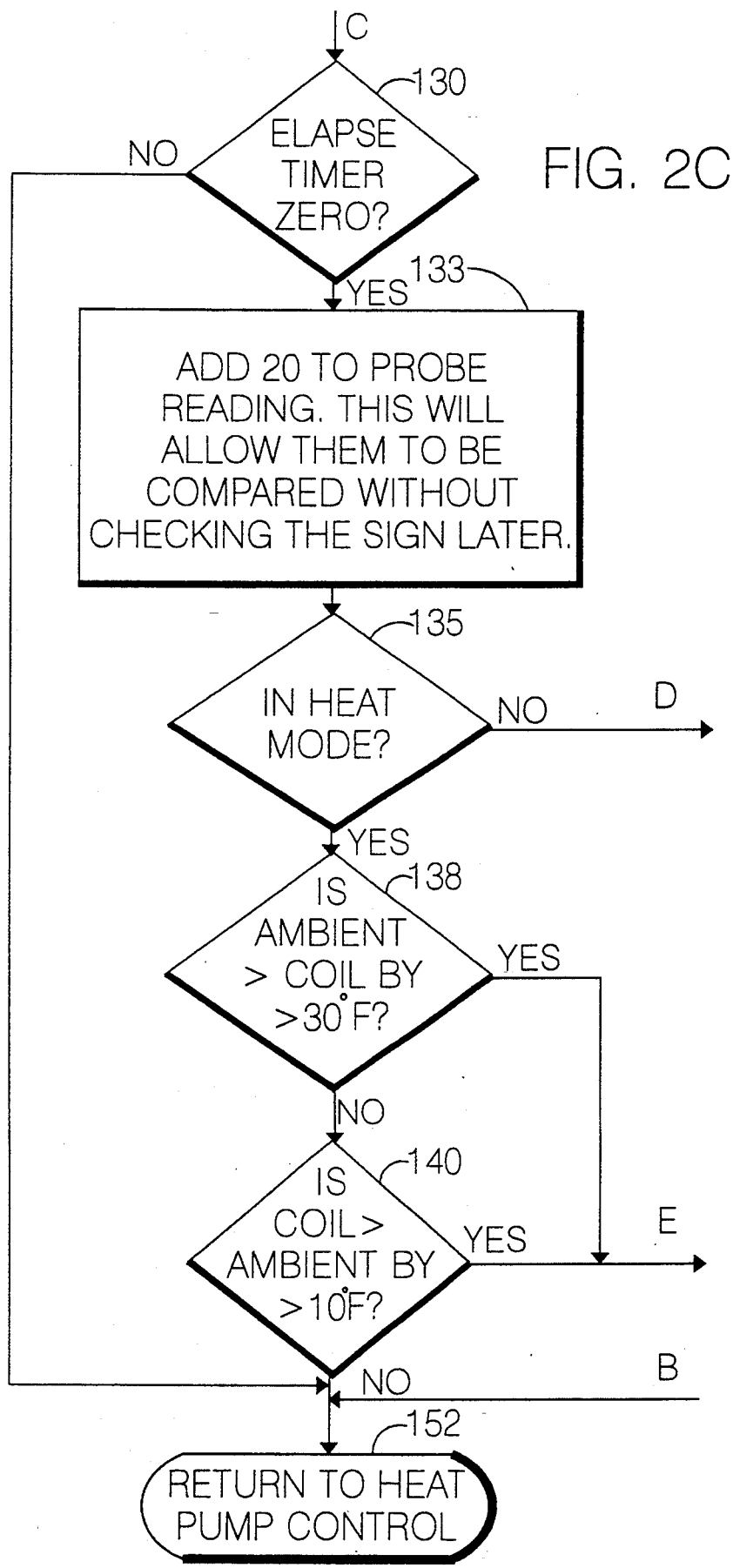

PROCESS FOR DETECTING OUT-OF-RANGE THERMISTOR

BACKGROUND OF THE INVENTION

1. Field of the Invention

This invention relates to the detection of an out-of-range condition in thermistors used in a climate control apparatus and, more particularly, to detection of an out-of-range condition in either or both of two thermistors in a two-speed heat pump.

2. Description of the Prior Art

The typical heat pump is comprised of four primary components of equipment including a compressor, a flow restriction valve, and two heat exchangers. One of the heat exchangers is customarily referred to as the heating or cooling coil, depending on the operating cycle, and is ordinarily positioned in the building structure within duct work employed for directing the circulating room air. A fan is typically positioned adjacent the heating and cooling coil to induce the circulating air to flow over the coil and through the duct work. The second heat exchanger (commonly known as the discharge coil), the compressor, and the flow restriction valve are typically contained within a single housing unit positioned on the exterior of the building structure to be heated or cooled. A discharge fan is provided adjacent the discharge coil to induce heat exchange between the discharge coil and the ambient air. These various heat pump elements are connected in a closed series loop by tubing carrying a liquid refrigerant. The direction of flow of refrigerant in the closed system is easily reversed by a series of valves. This ready reversal of refrigerant flow direction allows the heat pump to be quickly switched between its cooling and heating cycles.

The heat pump operates most efficiently when the temperature difference between the interior and exterior environments is less than approximately 50 degrees Fahrenheit. When this temperature difference increases out of the efficient operating range of the heat pump during the heating cycle, auxiliary heat is required, and usually provided by the combustion of fossil fuel in an oil or gas fired furnace or by resistance electric heat.

Current two-speed heat pump products have two thermistors; one senses the ambient temperature and the other senses the outdoor coil temperature. A number of heat pump functions are dependent upon the readings from these two thermistors. The outdoor coil thermistor (or defrost thermistor) is used to both initiate and terminate the defrost cycle of the heat pump. The value of the ambient thermistor is referenced in energizing the crankcase heater, determining the outdoor ICM (integrated control motor) speed, second-stage latching (allowing, under certain conditions, for second stage or high speed cooling to satisfy a call by the indoor thermostat for first stage cooling), the interfacing of the heat pump with the furnace, the heating switch-over speed point for setting the compressor level, defrost initiation, and the outdoor thermostat function for auxiliary heat.

In the prior art it was possible to determine if one of the thermistors was shorted out or frozen in an open condition. However it was not possible to determine if a thermistor was out of the proper resistance range. This could lead to possible problems; for example if the ambient temperature thermistor is out of range and reads low, the system will not initiate the defrost cycle when it should. However no error code would be provided to indicate the nature of the problem and, as a result, the control which should provide the error code may be misdiagnosed as being faulty rather than having the out-of-range condition of the thermistor being recognized and corrected.

In prior art patents, for example U.S. Pat. No. 5,097,288 to Akao et al. and U.S. Pat. No. 4,995,240 to Barthel et al. two thermistors are used in order to sense the temperature of different elements and control portions of a system accordingly (in Akao et al. in an image forming apparatus and in Barthel et al. to control refrigerant flow in an air conditioning system). However nowhere in the prior art is the problem of one of the thermistors being or becoming out of range considered.

SUMMARY OF THE INVENTION

It is therefore a primary object of the present invention to provide a process for determining if one of two thermistors used in a heat pump is out of range.

It is another object of the present invention to provide a process for comparing the temperature readings of two thermistors in a heat pump to determine if one of the thermistors is out of range.

These and other objects of the present invention are attained by a process for detecting and reporting an out-of-range condition in at least one of a plurality of thermistors operatively associated with a heat pump used as a climate control apparatus, the heat pump having an ambient thermistor and a coil thermistor, comprising the steps of: determining a coil thermistor value, determining an ambient thermistor value, comparing the coil thermistor value with the ambient thermistor value, and reporting to a heat pump control system if the ambient thermistor value is out of range with respect to the coil thermistor value.

BRIEF DESCRIPTION OF THE DRAWINGS

For a better understanding of these and other objects of the present invention, reference is made to the detailed description of the invention which is to be read in conjunction with the following drawings, wherein:

FIG. 2 is a diagram indicating the interconnection between FIGS. 2A–2D.

FIGS. 2A–2D is a flow chart showing the method of the instant invention.

DETAILED DESCRIPTION OF THE INVENTION

Figure 1:
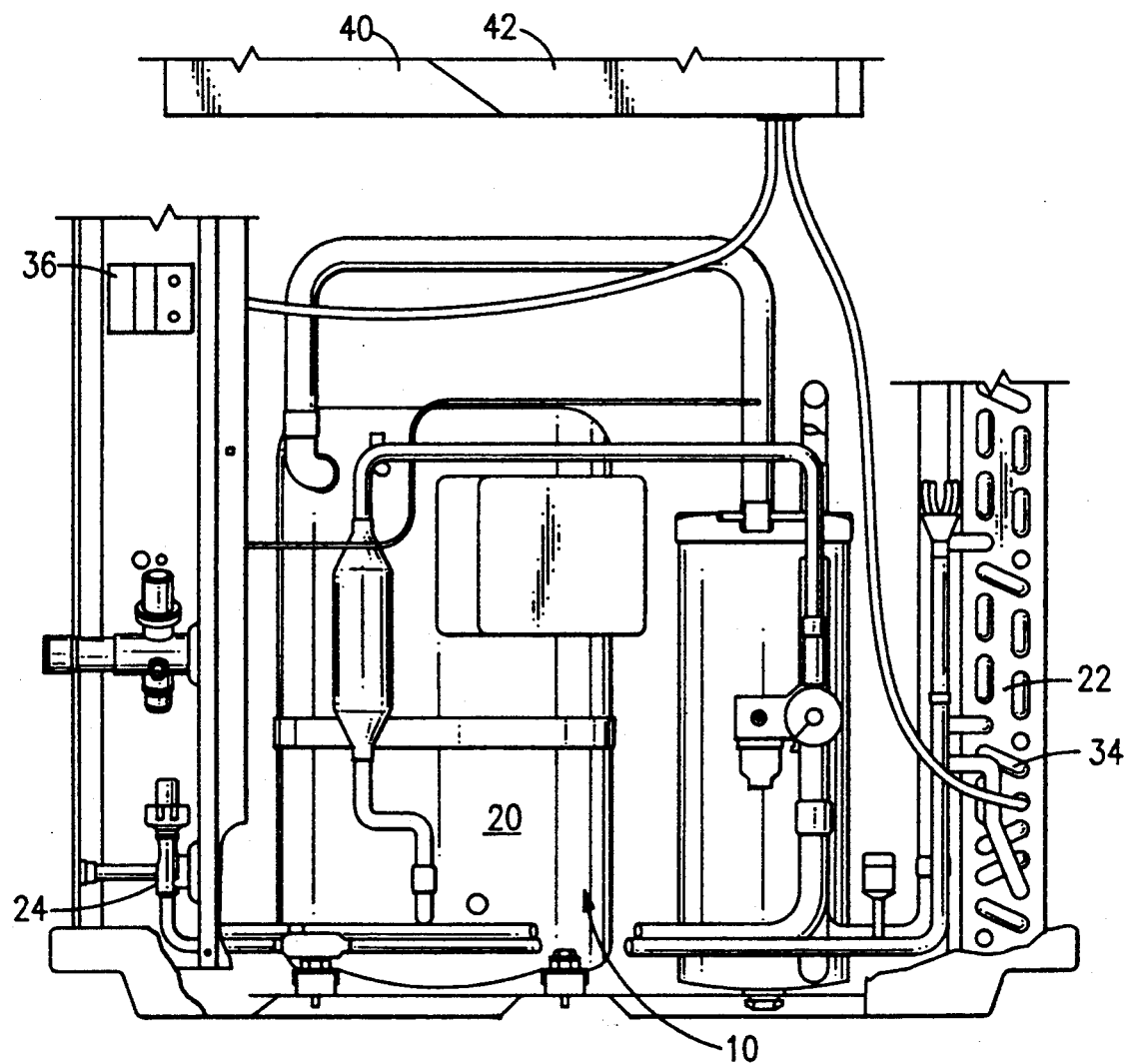
FIG. 1 is a schematic of a two stage heat pump incorporating two thermistors.

Turning now to the Drawing and particularly FIG. 1 thereof, there is shown a two-speed heat pump system generally referenced 10. The present invention is described in conjunction with a two-speed heat pump system only by way of illustration, rather than limitation. It should, therefore, be understood that the present invention may be utilized in any heat pump system incorporating two thermistors, including multistage heating systems of which the heat pump is a component, regardless of the nature of the system.

The heat pump 10 of FIG. 1 includes a compressor 20, a heat exchanger or outdoor coil 22, a flow restriction valve or metering device 24, and a second heat exchanger or indoor coil (not shown). A second flow restriction valve and the indoor coil are contained within a single housing unit positioned on the exterior of the building to be heated. The indoor coil is positioned within the interior of the building structure to be heated within a heating duct (not shown). The compressor 20, outdoor coil 22, flow restriction valve 24, and the indoor coil are connected by a closed refrigeration line (not shown) which is typically composed of copper piping.

During the heating cycle of the heat pump 10, the liquid refrigerant contained in the refrigerant line exits the compressor 20 in a vapor phase at a high temperature and pressure. The refrigerant then passes through the indoor heat exchanger where it is gradually cooled by the cooler circulating incoming room air. A main blower fan (not shown) is provided upstream of the indoor coil to induce the circulating room air through the indoor coil for proper heat exchange between the refrigerant in the indoor coil and the circulating room air. The refrigerant then exits the indoor coil in a liquid phase at moderate temperature, but still relatively high pressure. The liquid refrigerant is then directed through the refrigerant line into the flow restriction valve 24 which provides a substantial local pressure drop. The refrigerant exits the flow restriction valve 24 in a mixed liquid and vapor phase at a much lower temperature and pressure. The mixed phase liquid and vapor refrigerant is then directed to the outdoor coil 22 where it absorbs some heat from the cold ambient air on the exterior of the building structure to be heated. A discharge fan (not shown) is provided adjacent the outdoor coil 22 to induce a rapid flow of cold ambient air over the outdoor coil 22 thus increasing the rate of heat exchange between the circulating refrigerant and the cold ambient air. The cold refrigerant vapor then exits the outdoor coil and enters the compressor 20 at which point the heating cycle repeats.

During the cooling cycle the heat pump operates like a conventional air conditioner. The flow of the refrigerant is reversed and unit 10 functions as the condensing unit while restriction valve 24 is bypassed. Warm room air is cooled by heat exchange via first heat exchanger 22 and warmed air is discharged via the discharge coil.

A defrost cycle is provided in the heat pump which is activated when the heat pump is used in an environment where the outdoor temperature dips below 50° F., operating only while the heat pump is in heating mode. When the outdoor coil thermistor 34 reads at a temperature below 30° F. and the outdoor temperature is below 50° F., then, depending upon how the system is preset, every 90, 50 or 30 minutes the system performs a defrost cycle. The defrost cycle terminates either at the end of ten minutes or when the coil temperature reaches 80° F., whichever occurs first.

The heat pump system shown in FIG. 1 is used in conjunction with a two stage thermostat (not shown). The heat pump system 10 also includes a controller 40 having a timer 42 associated therewith. The controller 40 is a solid state semi-conductor device well known in the art that includes programming for operating the heat pump and the stages of electric heating. The thermostat is of a known type which allows an individual to set a setpoint temperature typically within the range of 65° to 75° F. as the desired room temperature.

Figure 2B:
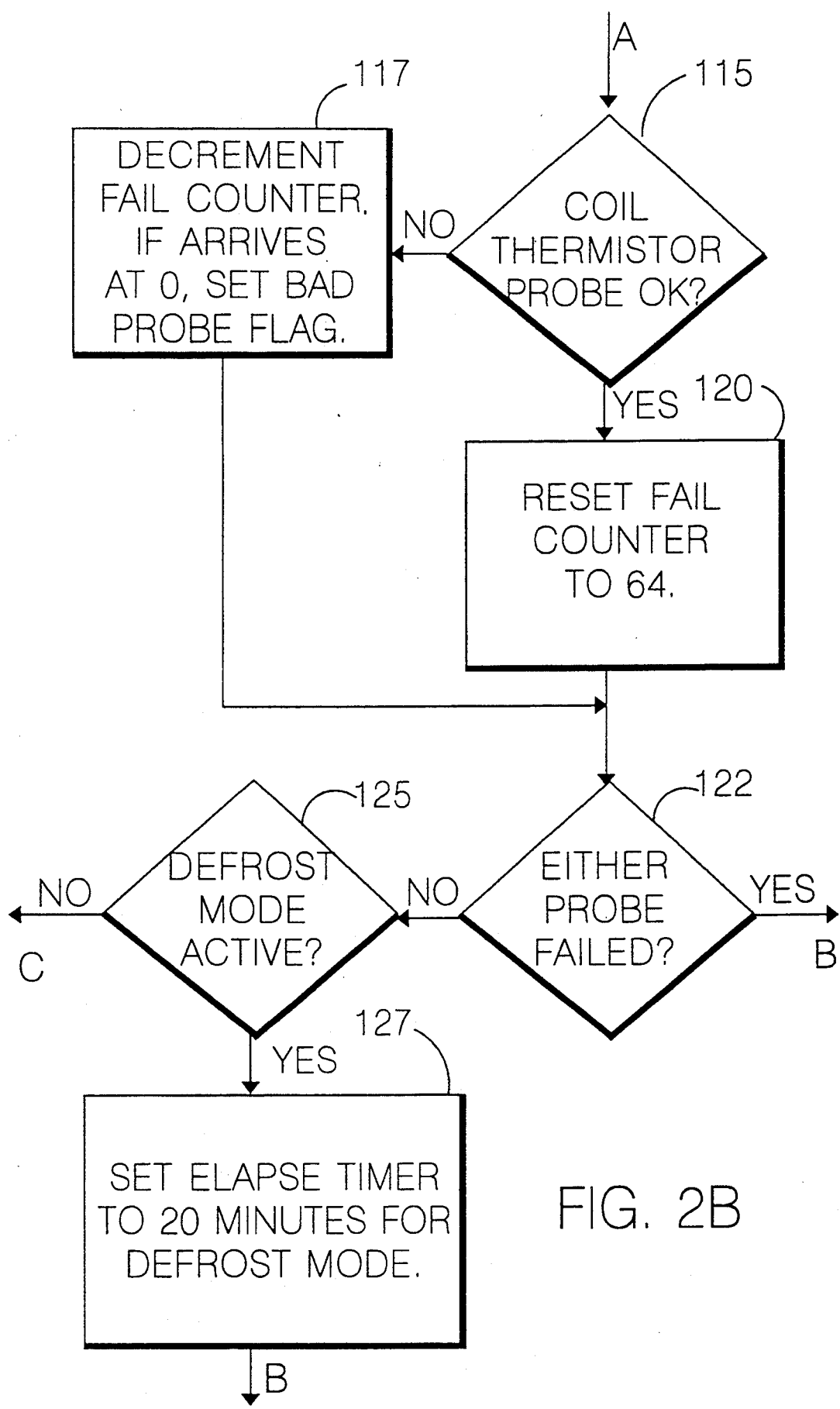
Figure 2D:
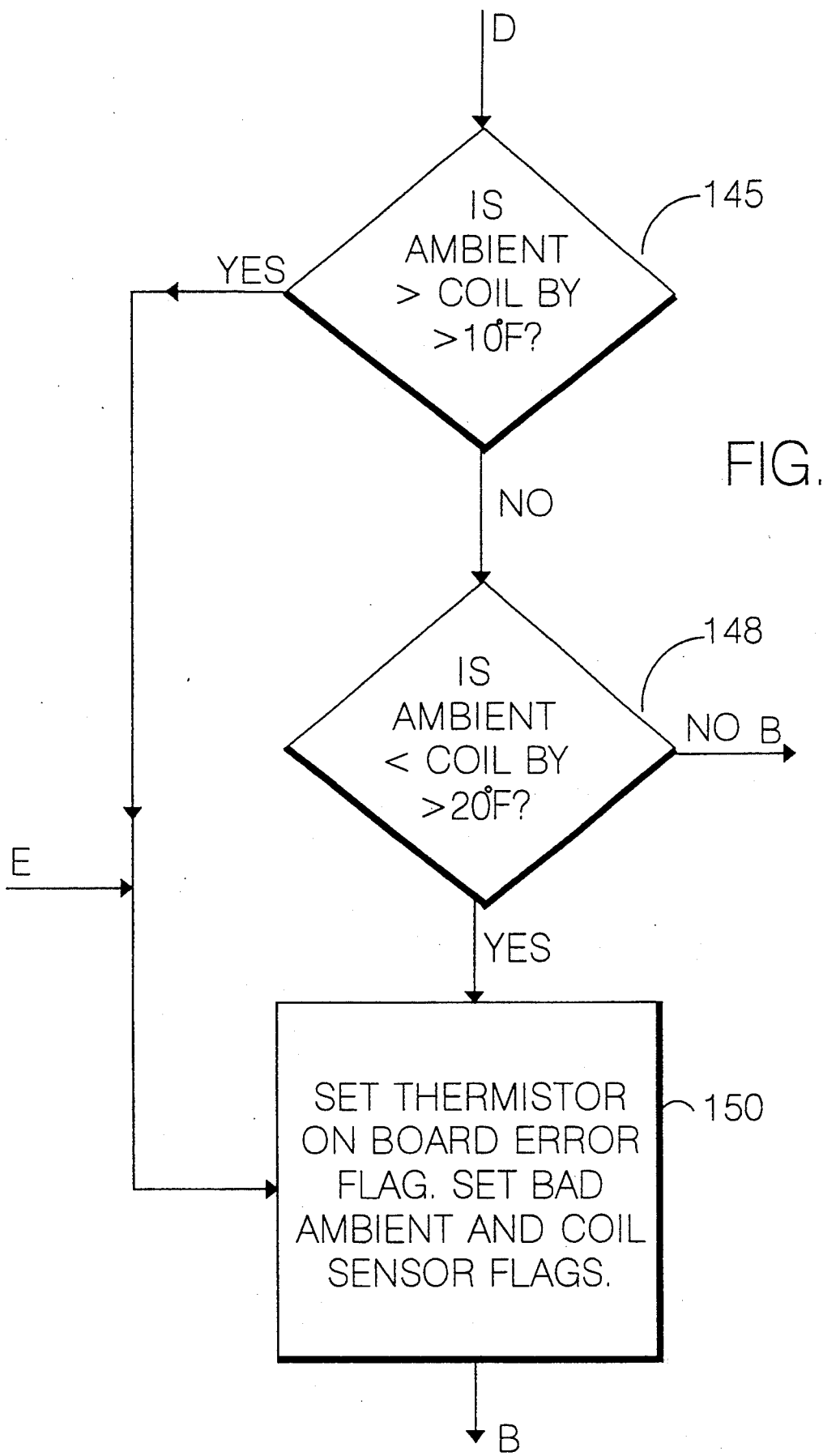

FIG. 2 shows the steps in a complete process for determining the existence of a fault in either of the two thermistors. The process, which is run at predetermined intervals, is initiated at step 100. Because of the possibility of noise, in reference or other signal aberrations, both thermistors are debounced in steps 103 through 120.

Debouncing is accomplished by first checking to see if a valid signal is produced by the ambient thermistor probe (or the ambient temperature thermistor) 36 in step 103. If there is none then in step 105 the Fail Counter is decremented. If the counter reaches zero the Bad Probe Flag is set; if not then step 103 is performed again. If at any time before the Fail Counter reaching zero, the ambient thermistor probe 36 sends an acceptable signal, then in step 108 the Fail Counter is reset to the value of 64.

Next is step 110 in which the compressor 20 is checked to see if it is operating. If not the routine terminates in step 152 and control is returned to the heat pump control system 40. If the compressor 20 is operating, then the coil thermistor probe (the coil thermistor) 34 is checked in step 115 to determine if it is producing a valid signal. If not, in step 117 the Fail Counter is decremented. If the counter reaches zero the Bad Probe Flag is set; if not then step 115 is repeated. If at any time before the Fail Counter reaching zero, the coil thermistor probe 34 sends an acceptable signal, then in step 120 the Fail Counter is reset to the value of 64. Because the probes are check serially a single counter can be used for checking both probes.

Next, in step 122, the Bad Probe Flag is tested to determine if either probe failed. If so then the routine terminate in step 152 and the master program (not shown) will handle the existence of a bad probe appropriately. If neither probe failed than a determination is made as to whether or not the defrost mode is active in step 125. If the defrost mode is active, then in step 127 to Elapse Timer 42 (here measuring time of defrost) is set to 20 minutes, indicating a 20 minute defrost cycle, and the routine terminates in step 152.

Next the Elapse Timer 42 is checked at step 130 to see if it is zero. If it is not zero then the system is still defrosting and the routine terminates in step 152. If the Elapse Timer value is zero, however, the range check of the present invention is initiated at step 133.

In that step, the values reported by the thermistors, which are based on electrical resistance and will be in a range of −20 to +106 are converted to equivalent temperature values in a range of between 0° F. and +126° F. It should be noted that at ambient temperatures below 0° F. the heat pump would not be adequate for heating and thus a furnace would be operating rather than the heat pump. Thus lower temperatures do not have to be considered. It should also be noted that although a temperature conversion is carried out and temperatures are compared, the resistances of the two thermistors may be directly or otherwise compared using any equivalent formulae.

Next, a determination is made at step 135 as to whether the heat pump 10 is in the heat mode or in the cool mode. If it is in the heat mode, then in step 138 a determination is made as to whether the ambient thermistor 36 temperature reading is greater than that coil thermistor 34 temperature by more than 30° F. If it is, an error condition exists and step 150 is performed. If it is not, a second determination is made, at step 40, to determine if the coil thermistor 24 temperature exceeds the ambient thermistor 36 temperature by more than 10° F. If so, an error condition exists and, here too, step 150 is performed. If not, then the thermistors are both functioning properly and control returns to step 130, determining whether or not the Elapse Timer value is zero.

If, on the other hand, the test of step 135 shows that the heat pump 10 is not in the heat mode, then it must be in the cool mode. Here again the differences between the two thermistors are tested. First, in step 145, a determination is made to see if the ambient thermistor 36 temperature exceeds the coil thermistor 34 temperature by more than 10° F. If it does, an error condition exists and step 150 is performed. If it is not, then a second determination is made, at step 148, to ascertain if the coil thermistor 34 temperature exceeds the ambient thermistor 36 temperature by more than 20° F. If so, an error condition exists and, here too, step 150 is performed. If not, then the thermistors are both functioning properly and the routine is terminated in step 152.

Turning now to step 150, which is performed if an error condition is sensed, in this step the Thermistor on Board Error Flag, and Bad Ambient and Coil Sensor Flags are all set. The main routine will then handle the error appropriately. It must be noted that while the heat pump control system is alerted as to the bad thermistor using software flags, this may also be done via hardware as, for example using interrupts.

While this invention has been explained with reference to the steps disclosed herein, it is not confined to the details set forth. Thus, for example, the order of testing is not critical nor are the exact ranges of variation between the ambient thermistor 36 and the coil thermistor 34. Thus, in the heating mode an error condition is indicated if the coil thermistor temperature is less than the ambient heating temperature, while in the cooling mode an error condition is indicated if the coil thermistor temperature is greater than the ambient thermistor temperature.

This application is intended to cover any modifications and changes as may come within the scope of the following claims:

What is claimed is:

1. A process for detecting and reporting an out-of-range condition in at least one of a plurality of thermistors operatively associated with a heat pump used as a climate control apparatus, the heat pump having an ambient thermistor and a coil thermistor, comprising the steps of:
   determining a coil thermistor value;
   determining an ambient thermistor value;
   comparing said coil thermistor value with said ambient thermistor value; and
   reporting to a heat pump control system if the ambient thermistor value is out of a predetermined range with respect to the coil thermistor value.

2. The method according to claim 1 wherein said step of reporting is accomplished by setting at least one software flag.

3. The method according to claim 1 wherein said step of reporting is accomplished by setting at least one hardware interrupt.

4. The method according to claim 1 wherein the coil thermistor value used for comparing is coil thermistor temperature and the ambient thermistor value used for comparing is ambient thermistor temperature.

5. The method according to claim 4 wherein said step of determining an ambient thermistor temperature is performed by determining electrical resistance of the ambient thermistor and converting the electrical resistance of the ambient thermistor to an ambient temperature value and the step of determining a coil thermistor temperature is performed by determining electrical resistance of the coil thermistor and converting the electrical resistance of the coil thermistor to coil temperature value.

6. The method according to claim 5 further comprising the step of determining whether the heat pump is operating in heating mode or cooling mode.

7. The method according to claim 6 wherein said out of range condition comprises, when in the heating mode, the coil thermistor temperature being less than the ambient thermistor temperature and when in the cooling mode, the coil thermistor temperature being greater than the ambient thermistor temperature.

8. The method according to claim 6 wherein said out of range condition comprises, when in the heating mode, a condition selected from the group of conditions consisting of the coil thermistor temperature being greater than the ambient thermistor temperature by more than ten degrees Fahrenheit or the ambient thermistor temperature being greater than the coil thermistor temperature by more than thirty degrees Fahrenheit, and when in the cooling mode, a condition selected from the group of conditions consisting of the coil thermistor temperature being less than the ambient thermistor temperature by at least twenty degrees Fahrenheit or the ambient thermistor temperature being greater than the coil thermistor temperature by more than ten degrees Fahrenheit.

* * * * *